United States Patent [19]
Bonsky et al.
[11] 3,728,488
[45] Apr. 17, 1973

[54] TELEPHONE ANSWERING SYSTEM AND APPARATUS INCLUDING IMPROVED RING RESPONSIVE CIRCUITRY FOR SELECTIVELY CONNECTING AND ISOLATING THE SYSTEM FROM THE TELEPHONE LINE

[75] Inventors: Elmer C. Bonsky, Long Beach; Lawrence A. Curtis, Huntington Beach, both of Calif.

[73] Assignee: T.A.D. Avanti, Inc., Paramount, Calif.

[22] Filed: May 8, 1972

[21] Appl. No.: 250,888

[52] U.S. Cl. ....................179/6 R
[51] Int. Cl. ....................H04m 1/64
[58] Field of Search ....................179/6 R, 6 AC, 6 E

[56] References Cited

UNITED STATES PATENTS

| | | | |
|---|---|---|---|
| 2,743,315 | 9/1972 | Van Deventer | 179/6 R |
| 2,912,504 | 11/1959 | Dagnall | 179/6 R |
| 2,832,830 | 4/1958 | Cain | 179/6 R |
| 3,410,959 | 11/1968 | Lamberg | 179/6 R |
| 2,883,461 | 4/1959 | Cain II | 179/6 R |
| 3,485,952 | 12/1969 | Walker | 179/2 A |

*Primary Examiner*—Raymond F. Cardillo, Jr.
*Attorney*—Keith D. Beecher

[57] ABSTRACT

An improved telephone answering system and apparatus is provided which includes circuitry for sensing telephone rings, and which in response thereto seizes and holds the telephone line, and which in its standby state is fully isolated from the telephone line from a direct current standpoint. The system and apparatus of the invention responds to the ring signal to seize the telephone line, normally for a first time interval $T_1$ while an announcement is transmitted over the line to the calling party, and then for a time interval $T_2$ to permit the calling party to record his message. The system and apparatus responds to changes in voltage or current on the telephone line, indicating that the calling party has hung up, to return the system to its standby condition, in which it is again disconnected from the telephone line. The system and apparatus has an additional feature in the form of a timing circuit which automatically returns it to an off mode, isolated condition, in the event that the transition from $T_1$ to $T_2$ does not occur within the system within a certain time interval for any reason. This timing circuit assures that the unit will immediately be disconnected from the telephone line in the event of any malfunction within its circuitry.

3 Claims, 3 Drawing Figures

TELEPHONE ANSWERING SYSTEM AND APPARATUS INCLUDING IMPROVED RING RESPONSIVE CIRCUITRY FOR SELECTIVELY CONNECTING AND ISOLATING THE SYSTEM FROM THE TELEPHONE LINE

RELATED PATENT APPLICATIONS

Ser. No. 184,702 filed Sept. 29, 1971 — Adapter Unit for Telephone Answering Instrument.

Ser. No. 189,268 filed Oct. 14, 1971 — Telephone Answering Instrument and System.

Ser. No. 52,636 filed July 6, 1970 — Telephone Answering Instrument and System, now abandoned.

BACKGROUND OF THE INVENTION

A telephone answering system and apparatus is described and claimed, for example, in Copending Application Ser. No. 52,636 which was filed July 6, 1970. The telephone answering system and apparatus described in the copending application is of the general type which includes a sensing circuit that responds to a ring signal on the telephone line to activate the answering instrument. Upon the receipt of the ring signal, the instrument is energized, and a recorded message is transmitted over the telephone line to the calling party. Subsequently, a message recording tape is activated within the answering instrument, in order that the calling party may record his message.

In the system described in the Copending Application Ser. No. 52,636, a situation could arise whereby the calling party may hang up during the transmission of the message to him by the system. Then when the system is ready to receive the message, a dial tone may occur on the telephone line. Unless additional control circuitry is incorporated, the instrument will record the dial tone and continue to do so until the end of its storage capability is reached. This means that the instrument is connected to the telephone line for a relatively long interval of time, and is disabled from receiving any further messages. It also means that the major part of its storage has been used to record a useless tone signal.

The Copending Application Ser. No. 184,702 which was filed Sept. 29, 1971 describes an extremely simple adapter unit which is intended to be interposed between the telephone answering system and apparatus described in the original application and the telephone line. The adapter unit of the latter application serves as an isolating means for the answering system and apparatus, and it responds to the hang up of the calling party to disconnect the telephone answering device from the telephone line. This means that should the calling party hang up at any time, instead of the instrument remaining coupled to the line and constituting a load on the line, the adapter unit of the copending application responds to the hang up to disconnect the telephone answering device and to isolate it from the telephone line. At that time, since there is no signal input to the telephone answering system, it will automatically turn itself off.

The present invention constitutes an improvement over the adapter unit described in the aforesaid Copending Application Ser. No. 184,702, and it provides a solid state switching circuitry which is incorporated directly into the telephone answering system and apparatus. The circuitry is such that in its standby condition the system is disconnected from the telephone line and is completely isolated from the line, except for a ring sensing circuit which is capacitively coupled thereto. When an AC ring signal appears on the line, this signal is sensed, and the solid state switching circuitry of the system then connects the system to the telephone line, so that the system may then undergo its normal operations in successive time intervals $T_1$ and $T_2$.

The circuitry of the invention is such that should a malfunction occur in the device during the time interval $T_1$, such as tape breakage, which would otherwise prevent the unit from completing its normal cycle, a timing circuit takes over to disconnect the instrument from the telephone line after a predetermined time interval corresponding, for example, to slightly longer than $T_1$. There is also solid state switching circuitry included in the unit that responds to any change in voltage or current on the telephone line, indicating that the calling party has hung up, or sensing the presence or discontinuance of a tone signal or busy signal on the telephone line, to disconnect the unit from the line and return it to its standby state.

DETAILED DESCRIPTION OF THE ILLUSTRATED EMBODIMENTS

Figure 1:
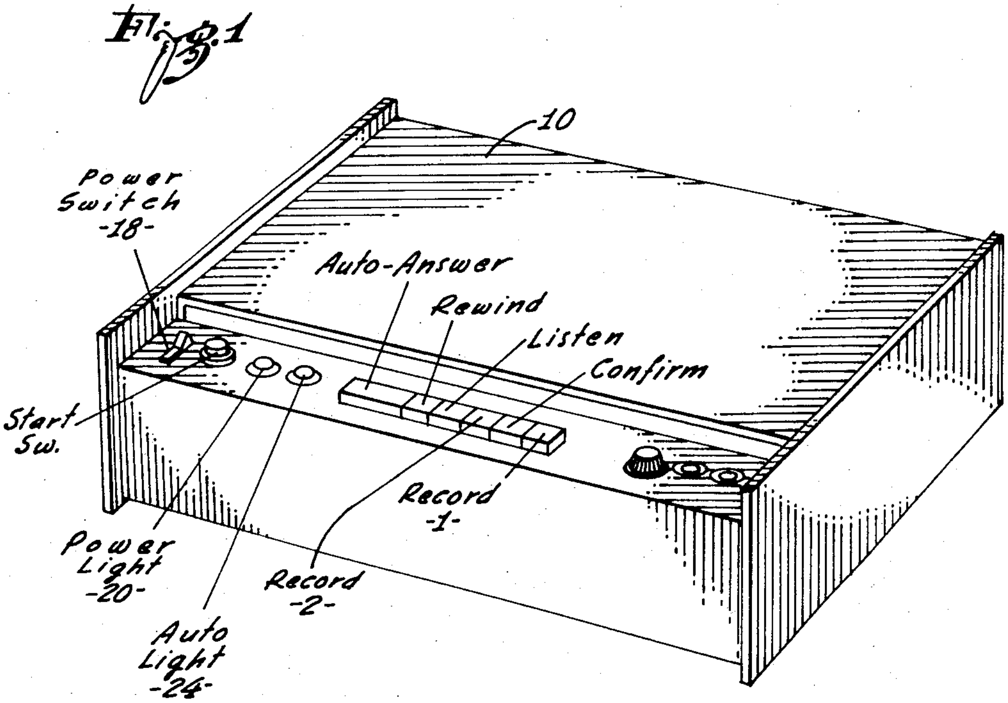
FIG. 1 is a perspective representation of a telephone answering instrument in which the control circuitry of the present invention may be incorporated.

The telephone answering unit shown in FIG. 1 is of the type which is used directly with the telephone line, and which may be plugged into a usual telephone jack. The apparatus, as described in the Copending Application Ser. No. 184,702, has the feature in that it operates independently of the telephone instrument, and does not require that the telephone instrument be placed on top of its housing, as is the case with most prior art units. The particular unit shown in FIG. 1 shows a housing 10 for the electronic control and switching circuitry, and the housing includes a control panel. A series of push button switches are mounted on the control panel, and these are designated "auto answer", "rewind", "listen", "confirm", "record 1", and "record 2". A thumb operated "on-off" power switch 18 is also located on the control panel. In addition, indicator lights such as the light 20 indicated "power" and the light 24 indicated "auto" are mounted on the control panel.

The telephone answering system is equipped with a loop announcement tape on which an announcement is recorded, so that at any time a telephone ring signal is received, the announcement is automatically made to the caller. The instrument also includes a message tape on which the incoming calls are recorded. Upon the receipt of a call, and during the first time interval $T_1$, the announcement recorded on the announcement tape is transmitted to the calling party. Then, the system enters its $T_2$ time interval, during which the calling party may record his message on the message tape.

In order to clarify the description of the present invention, only those portions of the circuit of FIG. 2 which involve the system of the present invention will be described. The other portions of the circuit of FIG. 2 are similar to those described in the copending applications, and perform the other functions of the telephone answering device such as described in detail therein.

Figure 2A:
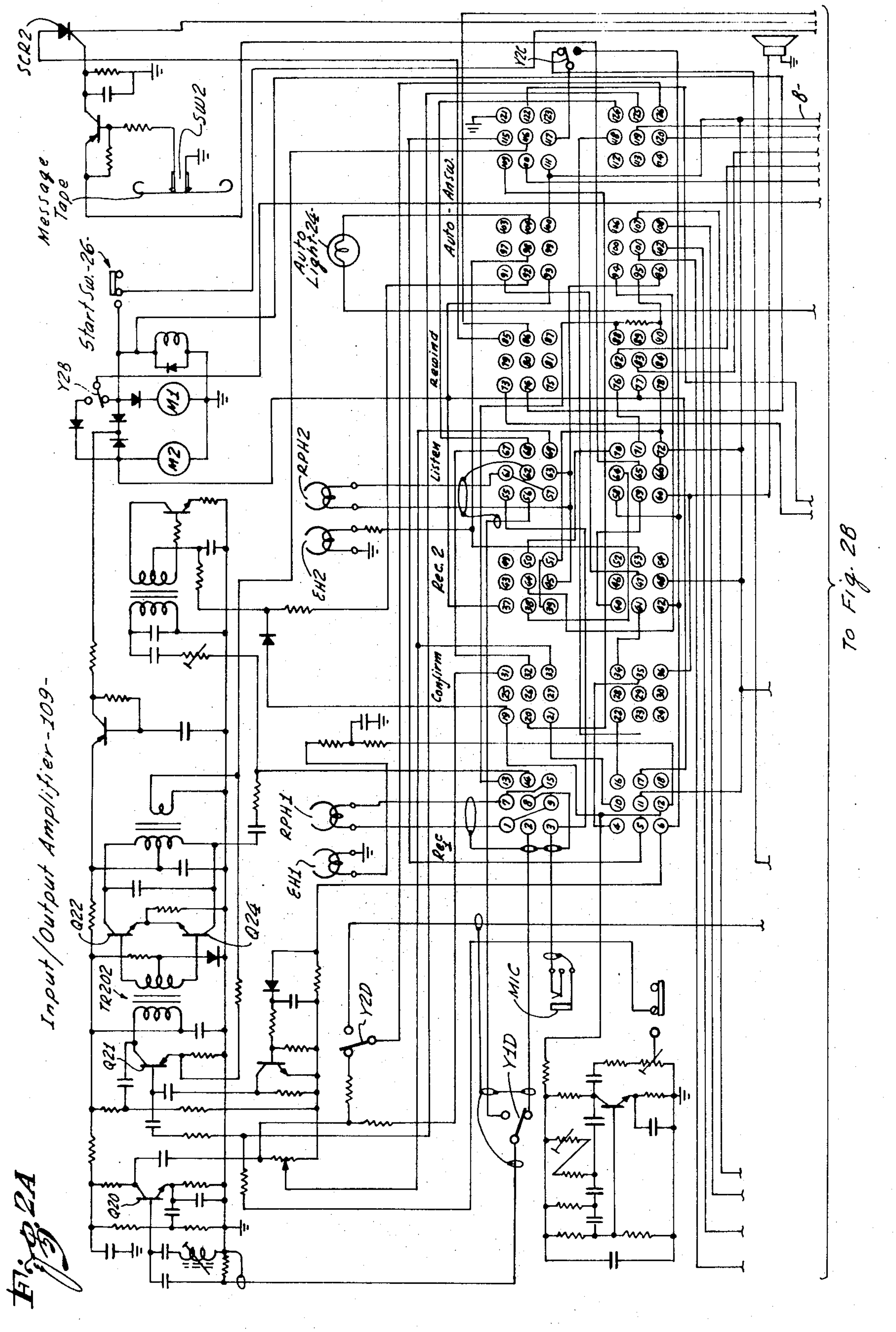
FIGS. 2A and 2B are diagrams showing in circuit detail the electronic system which may be incorporated into the instrument of FIG. 1, and which includes the solid state switching circuitry and timing circuitry of the present invention.
Figure 2B:
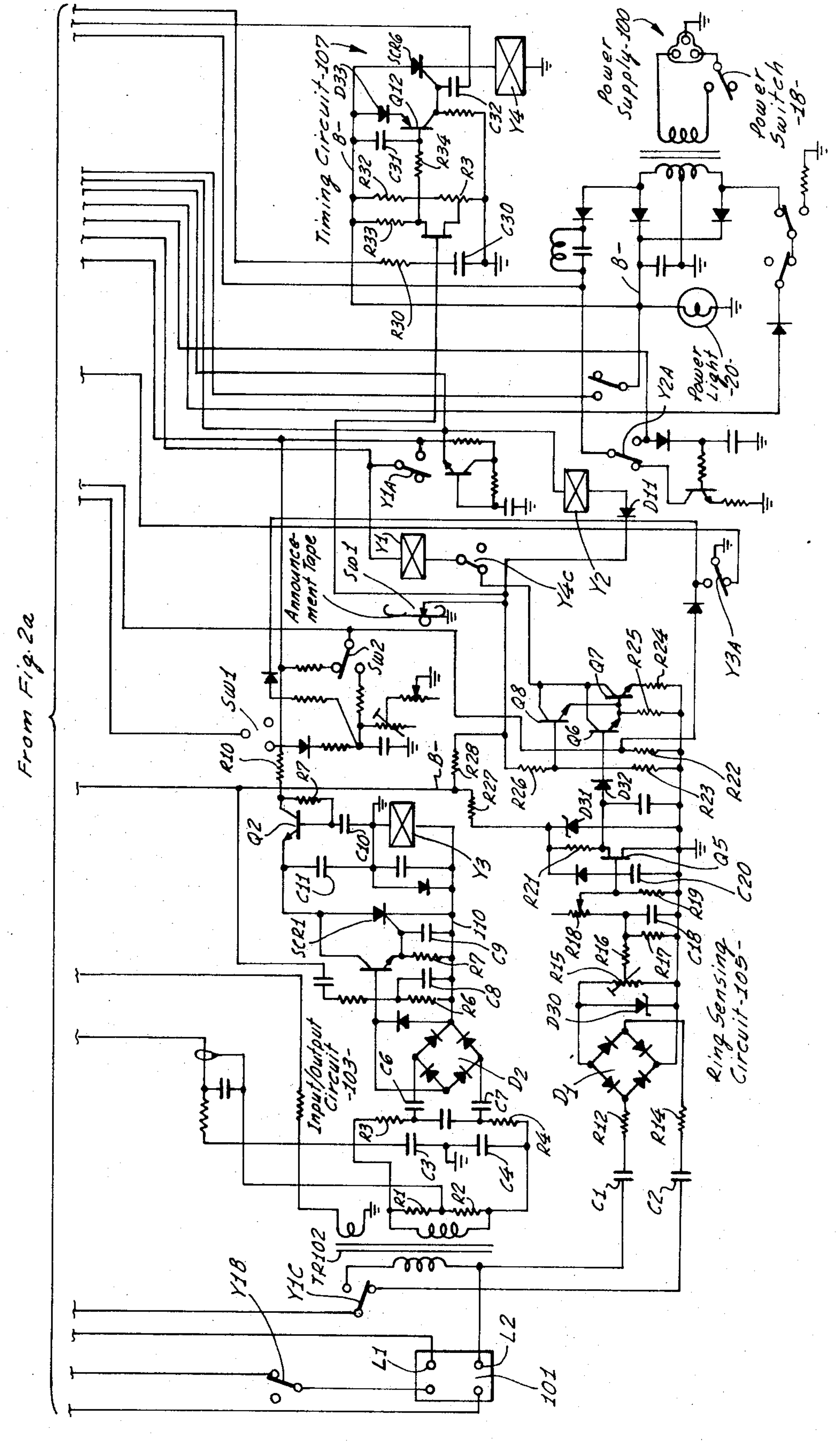

As shown in FIG. 2B, for example, the circuit includes a pair of input terminals L1 and L2 which are connected to a usual telephone receptacle 101.

The push button switches described in conjunction with FIG. 1 are six-pole double-throw switches as shown in FIG. 2A. For example, when the "record 1" push button switch is not actuated, its common terminals 2, 8 and 14 connect respectively with the upper terminals 1, 7 and 13, and its lower terminals 5, 11 and 17 connect respectively with its upper terminals 4, 10 and 16. However, when the push button switch is actuated, its common terminals 2, 8 and 14 connect respectively with its lower terminals 3, 9 and 15, whereas its common terminals 5, 11 and 17 connect respectively with its lower terminals 6, 12 and 18. This also applies to the "confirm" push button switch, the "record 2" push button switch, the "listen" push button switch, the "rewind" push button switch, and the "auto answer" push button switch, the latter being a dual type.

As a preliminary setting for the system, the "auto answer" push button switch is depressed, and the system is in its standby mode awaiting an incoming ring to set it in operation. For the actuated position of the "auto answer" switch, and when the power switch 18 is on, the power supply 100 in FIG. 2B is energized, so that a negative direct voltage is applied to the lead designated B−. This negative voltage causes the power light 20 to be energized. The auto light 24 is also on.

The system is now in its standby condition. The relay contacts Y1C are open, insofar as the transformer TR102 is concerned, and the system is disconnected from the telephone line, insofar as direct currents are concerned, so that no direct current load is placed on the line by the circuit. The relay contacts Y1C connect a pair of capacitors C1 and C2 to the terminals L1, L2, so that a ring sensing circuit 105 may be capacitively coupled to the line during the standby condition.

Now, should a ring signal be received on the telephone line, the signal is introduced by way of the input terminals L1 and L2 to the ring sensing circuit 105. The ring sensing circuit includes a diode bridge rectifier D1 which is connected through appropriate circuitry, and through relay contacts Y4C to a relay Y1. The relay Y1 becomes energized in response to the incoming ring signal, and closes its contacts Y1B so that a busy signal may be generated as described above, and also closes its contacts Y1C to connect the primary of the transformer TR102 to the telephone line. The relay Y1 also closes its contacts Y1A to energize the motor M1 and thereby drive the announcement tape.

The announcement on the announcement tape is sensed by a read head RPH1 and is passed through the now closed relay contact Y1D to an input-output amplifier 109. The amplified signal is applied to the upper right hand winding of the transformer TR102, and is coupled through the transformer to the phone line by way of the terminals L1 and L2.

The system is now in its $T_1$ time interval, during which the announcement recorded on the announcement tape is transmitted over the phone line. At the end of this interval $T_1$, the system is automatically switched to its second mode as a $T_1$ shut-off switch SW1 associated with the announcement tape completes a circuit to the relay Y2 to energize that relay. The relay Y1 remains energized. However, when the relay Y2 is energized, the relay contacts Y2B switch the power from the motor M1 to the motor M2. The announcement tape is now stopped, and the message tape begins to move.

However, should a malfunction occur during the time interval $T_1$, so that the system does not answer its normal $T_2$ mode, a timing circuit 107 operates to energize a relay Y4. When the relay Y4 is energized, the contacts Y4C open to de-energize the relay Y1, and thereby to set the system to an off mode in which its transformer TR102 is disconnected from the telephone line and in which it no longer responds to the ring signal.

If the system is operating normally, it enters its $T_2$ mode, and is now ready to record messages from the calling party. The incoming signals are now applied through the transformer TR102 to its lower right hand winding and through the relay contacts Y2D to the input/output amplifier 109. The amplified signals from the amplifier are then recorded on the message tape by a recording head designated RPH2.

If, at any time during $T_1$ or $T_2$, the calling party hangs up, or some other transition occurs on the telephone line, such as the commencement or termination of a busy signal, or the commencement or termination of a dial tone, the resulting change in line voltage or current, is sensed by a diode rectifier D2 in the input/output circuit, and the resulting output fires a silicon controlled rectifier SCR1 to energize a relay Y3. When the relay Y3 is energized, its relay contacts Y3A close placing a ground on the holding circuit for the relay Y1, so that the relay Y1 is deenergized, and the circuit is returned to its standby mode in which it is isolated from the telephone line.

The invention provides, therefore, an improved telephone answering system and apparatus which in its standby mode is isolated from the telephone line and produces no direct current mode on the line. In response to a ring signal on the telephone line, the answering system of the invention seizes the line, and automatically enters its announcement mode. The announcement is transmitted over the line, and the instrument then enters its $T_2$ mode, in which it responds and records any message from the calling party.

The system is constructed so that any transition in the telephone line voltage or current, indicating that the calling party has hung up, or that some other transition has occurred, causes the system to automatically return to its standby mode, in which it is isolated from the telephone line.

The system also includes a timing circuit, so that should a malfunction such as tape breakage occur in the system during the $T_1$ interval, the system will still disconnect itself from the telephone line after a predetermined interval, so that it does not remain coupled to the line during prolonged periods, even though a malfunction might have occurred.

When the system arrives at the end of the message tape, a switch SW2 closes which fires a silicon controlled rectifier SCR2 and which energizes the relay Y4 to place the system in the aforesaid off mode, in which it is disconnected from the phone line. The silicon controlled rectifier SCR2 remains conductive so long as the switch SW2 is closed, indicating that no further messages can be recorded on the message tape. It is to be noted that the system is no longer capable of responding to the rignal signal and, as such, it is maintained in a disconnected condition, insofar as the telephone line is concerned.

Therefore, incoming calls on the telephone line proceed as normal, with the phone ringing. The device of the invention is now disconnected from the telephone line, and remains in such a condition until the message tape is again returned to its origin position. It is to be noted that when the message tape is full, the device does not permanently hold the line, but removes itself completely from the telephone line, and, to all intents and purposes, is not present.

The input/output circuit 103 of FIG. 2B includes a pair of 330 ohm resistors R1 and R2 connected across the secondary of the transformer TR102. The resistors R1 and R2 are shunted by a pair of 0.0047 microfarad capacitors C3 and C4, the common junction of which is grounded. The capacitors, in turn, are bridged by a pair of 2 kilo ohm resistors R3 and R4 which are connected to a 0.0033 microfarad capacitor C5. The resistor R3 is connected to one side of the diode bridge through a 0.01 microfarad capacitor C6, and the resistor R4 is connected to the other side of the diode bridge through a 0.01 microfarad capacitor C7. The bridge is connected to the base of a transistor T1 in the input/output circuit 103, the base being connected to a 47 kilo ohm resistor R6 which is shunted by a 0.001 microfarad capacitor C8, the resistor and capacitor being connected to a common lead 110 extending from the bridge D2.

The emitter of the transistor Q1 is connected to a 1 kilo ohm resistor R7 which is shunted by a 0.0047 microfarad capacitor C9, the emitter being connected to the control electrode of the silicon control rectifier SCR1. The resistor R7, the capacitor C9 and the cathode of SCR1 are all connected to the lead 110. The collector of the transistor Q1 is connected to the anode of the silicon controlled rectifier SCR1, and to the emitter of an NPN transistor Q2. The base of the transistor Q2 is connected to a 33 microfarad capacitor C10 which is grounded. The emitter of the transistor Q2 is also connected to a grounded 47 microfarad capacitor C11. A 4.7 kilo ohm resistor R7 is connected between the base and collector of the transistor Q2.

The lead 110 is connected to one side of the relay Y3, the other side of which is grounded. The relay is shunted by a diode D29 and variable 1 microfarad capacitor C12. The collector of the transistor Q2 is also connected through a 5.6 ohm resistor R10 to the relay Y1. The capacitors C1 and C2 each have a value, for example, of 0.47 micromicrofarads. The capacitor C1 is connected through a 47 kilo ohm resistor R12 to one side of the diode bridge D1, and the capacitor C2 is connected through a 47 kilo ohm resistor R14 to the other side of the diode bridge.

The ring sensing circuit 105 includes a Zener diode D30 shunted across the bridge and a 50 kilo ohm potentiometer R15. The potentiometer R15 is connected to a 10 kilo ohm resistor R16, which, in turn, is connected to a grounded 47 kilo ohm resistor R17 and to a grounded 1 microfarad capacitor C18. The resistor R17 and capacitor C18 are connected to a variable 100 kilo ohm resistor R18 which, in turn, is connected to the gate electrode of a field effect transistor Q5 and to a grounded 1 megohm resistor R19. The gate electrode is also connected to a grounded 100 microfarad capacitor C20. The source electrode of the field effect transistor is grounded, and the drain electrode is connected to the B– lead through a 2.2 kilo ohm resistor R20. The drain electrode of the field effect transistor Q5 is connected through a 27 kilo ohm resistor R21 to the resistor R20, the junction of the resistors R20 and R21 being connected to a grounded Zener diode D31.

The drain electrode of the field effect transistor Q5 is also connected to a grounded 100 microfarad capacitor C21 and through a diode D32 to the base of an NPN transistor Q6. The base of the transistor Q6 is connected to a grounded 22 kilo ohm resistor R22. The emitter of the transistor Q6 is connected to the base of an NPN transistor Q7 and to the emitter of an NPN transistor Q8. The collector of the transistor Q7 is connected to the collector of the transistor Q6 and to the collector of a transistor Q8.

The emitter of the transistor Q6 is connected to a grounded 1 kilo ohm resistor R23, and the emitter of the transistor Q7 is connected to a grounded 2.2 kilo ohm resistor R24. The emitter of the transistor Q8 is connected to the base of the transistor Q7, and the base of the transistor Q8 is connected to a grounded 15 kilo ohm resistor R25 and to a 56 kilo ohm resistor R26. The resistor R26 is connected to the switch SW1 associated with the announcement tape, and through a diode D11 to the relay coil Y2. The resistor R26 is also connected to the B– lead through a 10 kilo ohm resistor R27. The collectors of the transistors Q6, Q7 and Q8 are connected to the normally closed contacts Y4C, the armature of which is connected to the relay Y1.

The timing circuit 107 includes a 1 megohm resistor R30 which is connected to the gate electrode of a field effect transistor Q10. The gate electrode is also connected to a grounded 100 microfarad capacitor C30. The source electrode of the transistor Q10 is connected to a 5 kilo ohm potentiometer R31. The potentiometer is also connected to the B– lead of the power supply 100 through a 4.7 kilo ohm resistor R32. The drain electrode of the transistor Q10 is connected to the B– lead through a 3.3 megohm resistor R33. The source electrode is also connected through a 10 kilo ohm resistor R34 to the base of a PNP transistor Q12.

The collector of the transistor Q12 is connected to a grounded 10 kilo ohm resistor R35 and to the gate electrode of a silicon controlled rectifier SCR6. The cathode of the silicon controlled rectifier SCR6 is connected to the relay Y4, and its anode is connected to the lead B–. The emitter of the transistor Q12 is connected through a diode D33 to the B– lead, and the base electrode of the transistor Q12 is connected through a microfarad capacitor C31 to that lead. The gate electrode of the silicon controlled rectifier SDR6 is connected through a 3.3 microfarad capacitor C32 to the cathode.

The input/output amplifier 109 of FIG. 2*a* includes an NPN transistor Q20 connected as a preamplifier, and coupled to a PNP transistor Q21. The transistor Q21 is coupled through a transformer TR202 to a pair of NPN transistors Q22 and Q24 connected as a push-pull power amplifier state.

The circuit of FIG. 2*a* also includes an oscillator 200 which supplies a bias signal to the record heads RPH1 and RPH2, and which also provides a beep tone for the system. A microphone may be plugged into the plug designated MIC for recording signals on the announcement tape. The remaining circuitry of FIG. 2*a* is similar to that described in the copending applications referred to above, and will not be described in further detail herein.

While a particular embodiment of the invention has been shown and described, modification may be made, and it is intended in the following claims to cover all modifications which fall within the spirit and scope of the invention.

What is claimed is:

1. In a telephone answering system for responding to telephone messages received over a telephone line and which comprises an announcement storage means and a message storage means and respective associated transducers, and which further comprises first and second means for driving said announcement storage means and message storage means respectively relative to said transducers for producing a recorded announcement from the announcement storage means in response to an incoming telephone call and for subsequently recording a message from the calling party on said message storage means, and which further includes first control circuit means for activating said announcement storage driving means in response to said incoming telephone call to produce said recorded announcement for transmission over the telephone line to the calling party during a first time interval, second control circuit means coupled to said announcement storage means for activating said message storage driving means at the termination of the announcement so as to initiate the recording of the aforesaid message from the calling party on said message storage means during a second time interval, third control circuit means for deactivating said message storage means so as to terminate the recording of the aforesaid message on said message storage means, and an input/output circuit coupled to said announcement storage means for introducing the announcement thereon to the telephone line and coupled to said message storage means for introducing the message from the calling party thereto; the combination of: a ring signal sensing circuit, a first relay switch connected to said ring signal sensing circuit to be actuated thereby to connect said input/output circuit to the telephone line in response to a ring signal received over the line, electric circuitry connected to the telephone line and including capacitive coupling means presenting relative low impedance to said ring signal to pass said ring signal to said ring signal sensing circuit so as to cause said ring signal sensing circuit to actuate said first relay means, and said electric circuitry presenting relatively high impedance to other signals received over the telephone line to attenuate said other signals and thereby prevent said other signals from reaching said input/output circuit, a second relay switch connected to said telephone line and responsive to the activation of said first relay switch to disconnect said high impedance circuitry and to connect said input/output circuit to the telephone line so as to cause message signals received over the telephone line to be introduced to said input/output circuit, and a control circuit connected to said input/output circuit and responsive to a change in signal level on the telephone line to de-activate said second relay switch and disconnect and isolate said input/output circuit from the telephone line should communication with the calling party be interrupted during the first or second time interval.

2. The combination defined in claim 1, and which includes a timing circuit connected to said second relay switch for causing said second relay switch to disconnect the system from the telephone line after a predetermined time interval greater than said first time interval.

3. The combination defined in claim 1, and which includes circuitry for automatically de-activating said first control means and activating said second control means at the end of said first time interval.

* * * * *